(12) United States Patent
He et al.

(10) Patent No.: US 12,537,667 B2
(45) Date of Patent: Jan. 27, 2026

(54) METHODS AND SYSTEMS FOR USING SMART NETWORK INTERFACE CARDS TO SECURE DATA TRANSMISSION BETWEEN AN INITIATOR HOST RUNNING AN OBJECT AND A TARGET HOST EQUIPPED WITH A DISAGGREGATED HARDWARE DEVICE THAT SATISFIES HARDWARE SPECIFICATIONS OF THE OBJECT

(71) Applicant: VMware LLC, Palo Alto, CA (US)

(72) Inventors: Jin He, Beijing (CN); Bing Niu, Beijing (CN); Jinheng Xu, Beijing (CN); Juan Liu, Beijing (CN); Xiangjun Song, Beijing (CN)

(73) Assignee: VMware LLC, Palo Alto, CA (US)

( * ) Notice: Subject to any disclaimer, the term of this patent is extended or adjusted under 35 U.S.C. 154(b) by 220 days.

(21) Appl. No.: 18/308,131

(22) Filed: Apr. 27, 2023

(65) Prior Publication Data

US 2024/0364501 A1    Oct. 31, 2024

(51) Int. Cl.
*H04L 9/08*    (2006.01)
*H04L 9/00*    (2022.01)

(52) U.S. Cl.
CPC ............ *H04L 9/0819* (2013.01); *H04L 9/006* (2013.01)

(58) Field of Classification Search
CPC ..... H04L 9/0819; H04L 9/006; H04L 9/0825; H04L 9/0877; H04L 9/0897; H04L 9/082
USPC ......................................................... 713/171
See application file for complete search history.

(56) References Cited

U.S. PATENT DOCUMENTS

| | | | | |
|---|---|---|---|---|
| 2003/0188161 | A1* | 10/2003 | Ndiaye | H04L 63/045 713/168 |
| 2017/0346742 | A1* | 11/2017 | Shahar | H04L 1/1635 |
| 2019/0034237 | A1* | 1/2019 | Siddappa | H04L 67/1012 |
| 2020/0220713 | A1* | 7/2020 | Li | H04L 9/14 |
| 2020/0259799 | A1* | 8/2020 | Li | H04L 9/0897 |
| 2023/0006981 | A1* | 1/2023 | Syrivelis | G06F 9/45558 |
| 2023/0177146 | A1* | 6/2023 | Dastidar | G06F 21/6209 726/22 |

FOREIGN PATENT DOCUMENTS

EP        2186251 A2 *  5/2010  ......... H04L 12/4625

* cited by examiner

*Primary Examiner* — Bryan F Wright
(74) *Attorney, Agent, or Firm* — Kim & Stewart LLP

(57) ABSTRACT

This disclosure is directed to methods and systems that establish a secure data channel between a host and a disaggregated hardware device ("DHD") of a data center. The system comprises an initiator host that runs objects, such as virtual machines and containers. The host includes an initiator smart network interface card ("SNIC"). The initiator SNIC includes a virtual device, a trust platform module ("TPM") and a security engine. The system also comprises a target host equipped with a DHD and a target SNIC. The target SNIC includes a TPM and a security engine. The TPM and the security engine of the initiator SNIC and the TPM and the security engine of the target SNIC establish a secure data channel between an object running on the host and the DHD.

13 Claims, 11 Drawing Sheets

METHODS AND SYSTEMS FOR USING SMART NETWORK INTERFACE CARDS TO SECURE DATA TRANSMISSION BETWEEN AN INITIATOR HOST RUNNING AN OBJECT AND A TARGET HOST EQUIPPED WITH A DISAGGREGATED HARDWARE DEVICE THAT SATISFIES HARDWARE SPECIFICATIONS OF THE OBJECT

TECHNICAL FIELD

This disclosure is directed to securing data transmission of disaggregated hardware in a data center.

BACKGROUND

Data centers are composed of networked server computers (also called "hosts") and storage appliances that are used to organize, process, and store large amounts of data. Data centers are made possible by advances in virtualization, computer networking, distributed operating systems, data-storage appliances, computer hardware, and software technologies. Data centers offer a utility model that enable organizations, such as businesses and governments, to run their applications and provide cloud services over the Internet on platforms that are maintained and run entirely in the data centers and the organizations pay for processing and data storage as needed. This utility model has reduced the cost to organizations of maintaining their own centralized computing networks and hosts. To keep pace with the increasing demand for processing and storage, data centers have grown in size and complexity. System administrators manage data centers with the aid of centralized management utilities that have been developed to automate management of virtual machines, containers, hosts, and dependent components from a centralized location within each data center. The management utilities enable data centers to operate with greater efficiency and productivity.

With the rise of virtualization and cloud computing techniques, applications running in data centers have grown in complexity and become increasingly more computationally demanding. As a result, data centers have expanded computational resources (i.e., CPUs, memory, storage) of hosts to include hardware accelerators, large capacity memory, and faster data storage. Hardware acceleration is the process of offloading certain computational tasks onto specialized hardware accelerators, such as graphics processing units ("GPUs") and field programmable gate arrays ("FPGAs"), enabling greater computational efficiency than is possible with running the computational tasks on general-purpose CPUs. For example, hardware accelerators and large capacity memory have increased the efficiency of high-performance computing ("HPC"), such as applications executing artificial intelligence ("AI") and machine learning ("ML") algorithms. However, data centers have traditionally used a monolithic server model in which the resources of each host are isolated from applications executing in other hosts. This monolithic sever model is inflexible in terms of efficient resource utilization, integration of new hardware resources, and handling of resource failures.

Data centers have recently implemented resource disaggregation which treats resources of hosts as a pool of network-attached, stand-alone hardware devices that applications executing in different hosts of the data center can access via the data center network. In a disaggregated architecture, the resources of hosts are no longer isolated, allowing the resources to be separately provisioned and used by applications executing on different hosts in the data center. For example, many data centers offer access to hardware accelerators as a service to speed up processing. With disaggregation, a hardware accelerator located in one host can be used by an application executing in another host located elsewhere in the data center. Disaggregation enables the data center environment to adapt to changing workloads and increase efficiency in resource usage. For example, resource usage can be scaled as needed based on application and workload requirements without interrupting the availability of resources to applications running in the data center.

However, disaggregation has created a breakdown in the trusted computing environment of a data center. To construct a trusted computing environment in a traditionally operated data center, each host has a trusted platform module ("TPM") that establishes a trusted environment for protecting the host from malicious attacks, such as malware, virus, and packet sniffing. For example, a TPM can be used to protect host data via encryption and decryption, authenticate credentials of other hosts running in the data center, and prove which software is running on a host in the data center. In a data center with various disaggregated hardware devices ("DHDs"), the DHDs are accessible from different applications executing in the data center. However, conventional approaches to trusted computing cannot practically be used with separate DHDs. As a result, the trustworthiness of DHD utilized by applications executing on other hosts in the data center is simply assumed, leaving hosts that utilize DHDs and hosts with DHDs unprotected and vulnerable to malicious attacks. Systems administrators recognize a need for protecting data transmissions between disaggregated resources and hosts from malicious tampering.

SUMMARY

This disclosure is directed to methods and systems for establishing a secure data channel between a host and a disaggregated hardware device ("DHD") of a data center. The system comprises an initiator host that runs objects, such as virtual machines and containers. The host includes an initiator smart network interface card ("SNIC"). The initiator SNIC includes a virtual device, a trust platform module ("TPM") and a security engine. The system also comprises a target host equipped with a DHD and a target SNIC. The target SNIC includes a TPM and a security engine. The TPM and the security engine of the initiator SNIC and the TPM and the security engine of the target SNIC establish a secure data channel between an object running on the host and the DHD. The virtual device presents the DHD to the initiator host as a local hardware device, thereby enabling the object to use the DHD over the secure data channel.

DETAILED DESCRIPTION

Figure 1:
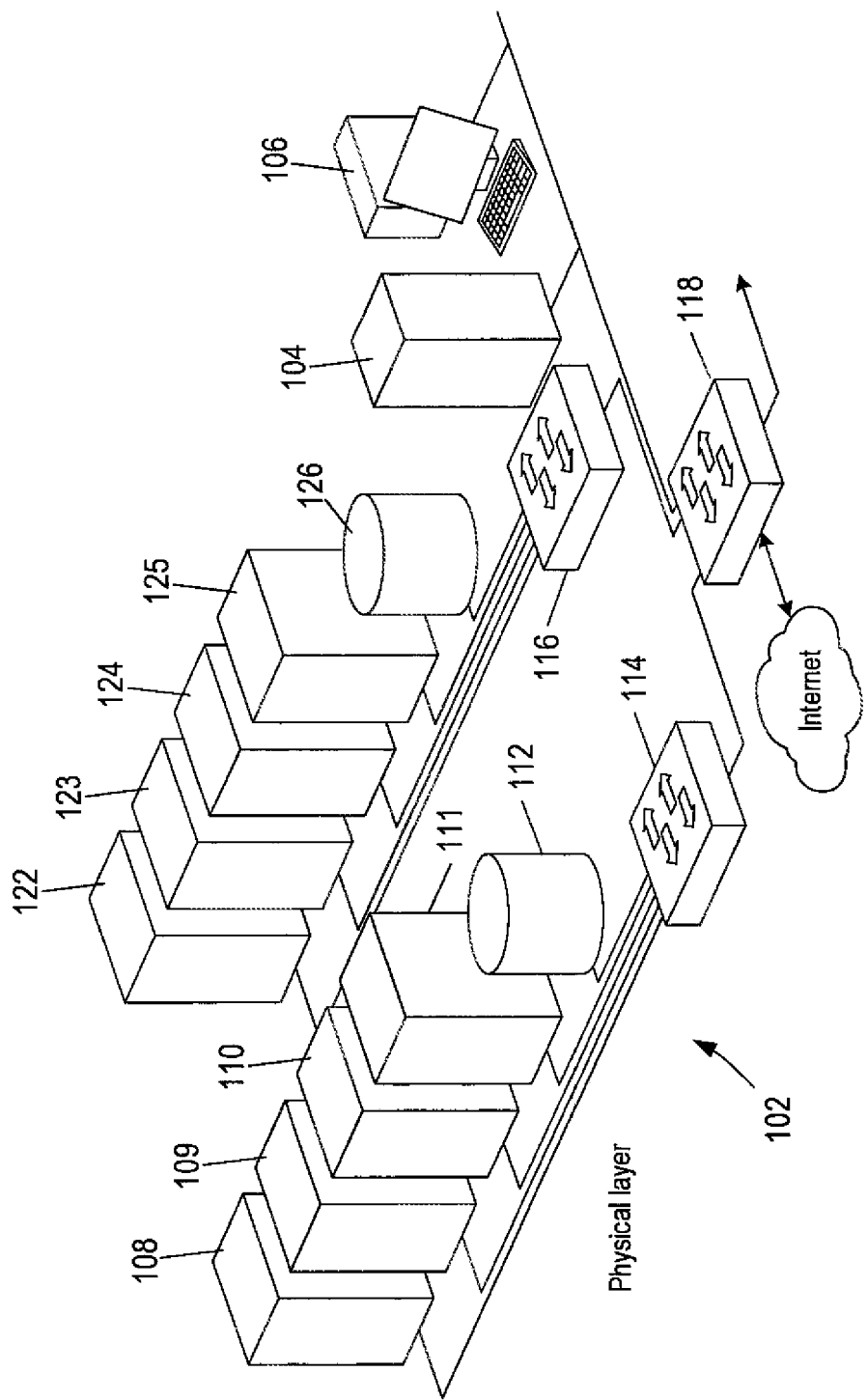
FIG. 1 shows an example of a data center and a host to be attested to before the host can be added to the data center.

This disclosure presents automated computer-implemented processes for securing disaggregated hardware used by applications executing in a data center. FIG. 1 shows an example of a data center 102. The data center 102 comprises a management server computer 104 and any of various computers, such as PC 106, on which a virtual-data-center management user interface may be displayed to system administrators and other users. Objects of the physical data center 102 additionally include server computers, called "hosts," such as hosts 108-111, mass-storage devices, such as a mass-storage device 112, switches 114 and 116, and a top of rack ("TOR") switch 118 that connects the server computers and mass-storage devices to the Internet, the virtual-data-center management server 104, the PC 106, and other server computers and mass-storage arrays (not shown) of the data center 102. In the example of FIG. 1, each of the switches 114 and 116 interconnects four server computers and a mass-storage device to each other and connects the server computers and the mass-storage devices to the TOR switch 118. For example, the switch 114 interconnects the four server computers 108-111 and the mass-storage device 112 to the TOR switch 118 that is in turn connected to the switch 116, which interconnects four hosts 122-125 and a mass-storage device 126. The example physical data center 102 is provided as an example of a data center. Physical data centers may include a multitude of server computers, networks, data storage systems, and devices connected according to many different types of connection topologies.

Figure 2:
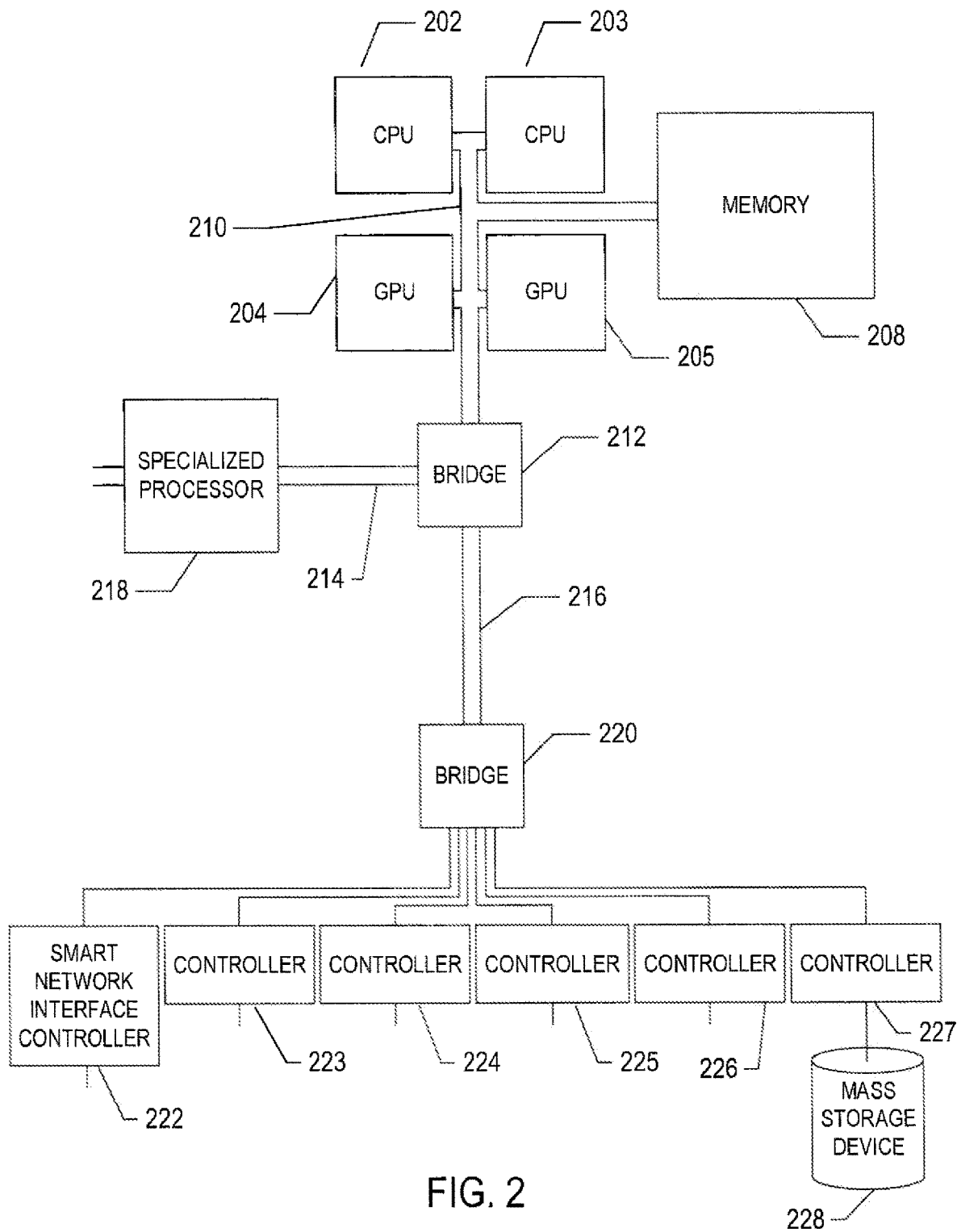
FIG. 2 shows an example architecture of a host to be added to the data center shown in FIG. 1.

FIG. 2 shows an example architecture of a host. In this example, the host contains two central processing units ("CPUs") 202-203, two graphics processing units ("GUIs") 204-205, one or more electronic memories 208 interconnected with the CPUs and GPUs by a processor/memory-subsystem bus 210 or multiple busses, a first bridge 212 that interconnects the processor/memory-subsystem bus 210 with additional busses 214 and 216, or other types of high-speed interconnection media, including multiple, high-speed serial interconnects. The busses or serial interconnections, in turn, connect the CPUs, GPUs, and memory with specialized processors 218 and with one or more additional bridges 220. The specialized processors 218 can be any one or more of an application specific integrated circuit ("ASICs"), a field programmable gate array ("FPGA"), cryptographic accelerator, secure cryptoprocessor, digital signal processor, network processor, network on a chip, and systolic arrays. The bridges 220 are interconnected to a smart network interface controller ("SNIC") 222, and multiple controllers 223-227. The controllers 222-227 are connected to the bridge 220 with high-speed serial links, such as peripheral component interconnect express ("PCIe") serial expansion busses. The controllers 223-227 are expansions cards that interface with different types of peripheral devices. The SNIC 222 is a component that connects the host 128 to a network of the data center. An example implementation of the SNIC 222 is described below with reference to FIG. 3. The controller 227 interfaces with a computer-readable medium 228. The other controllers can interface with electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the host 128 to interact with human users. The computer-readable medium 228 is a data-storage device, including a solid-state drive ("SSD"), electronic memory, optical or magnetic disk drive, a magnetic tape drive, USB drive, flash memory and other such data-storage device.

Figure 3:
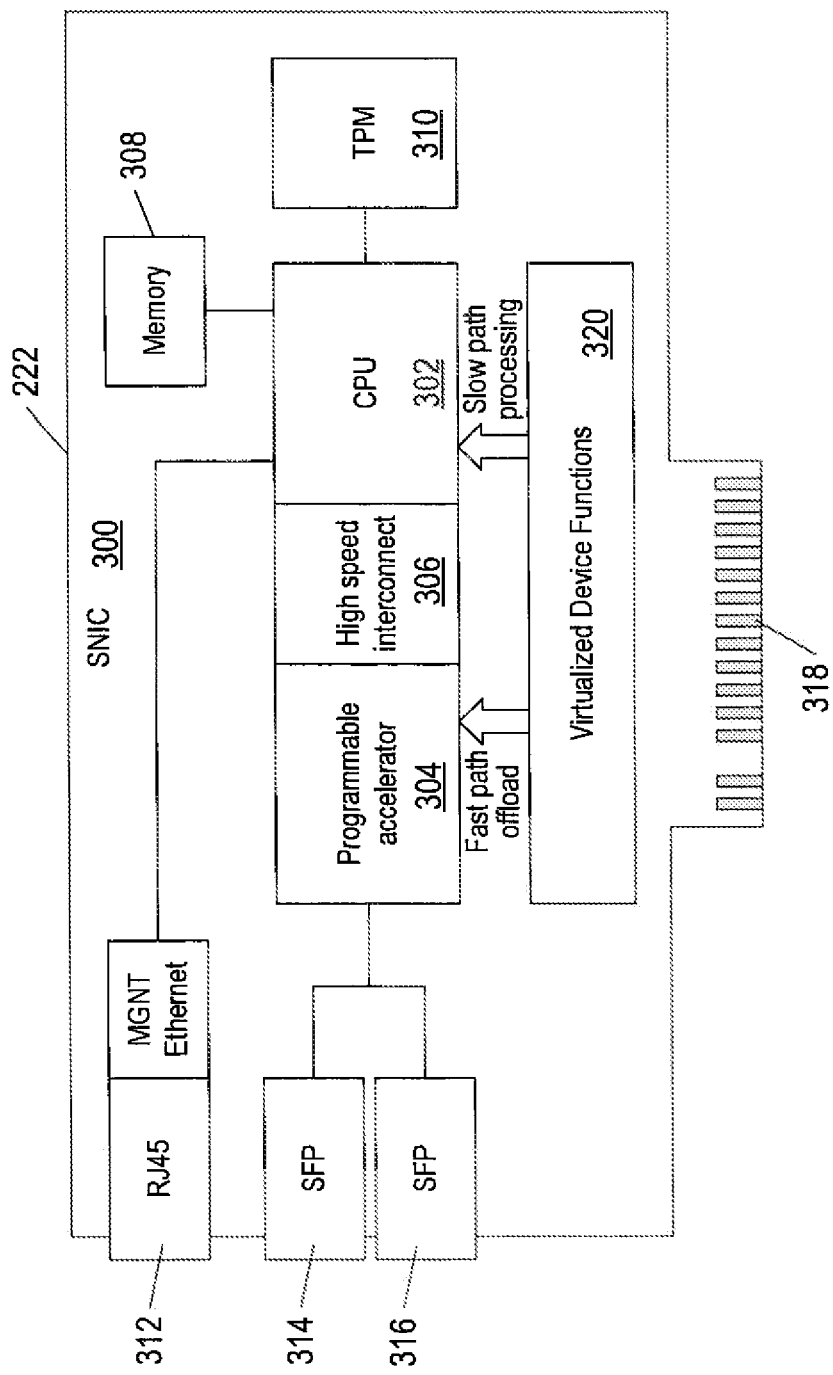
FIG. 3 shows an example architecture of a smart network interface controller ("SNIC") of the host shown in FIG. 2.

FIG. 3 shows an example architecture of the SNIC 222 shown in FIG. 2. The SNIC 222 includes a CPU 302 that is connected to a programable accelerator 304 via a high-speed interconnect 306 mounted on a printed circuit board 300. The SNIC 222 includes memory 308 and a trusted platform module ("TPM") 310 that are mounted on the circuit board and connected to the CPU 302. In this example, the CPU 302 is connected to an RJ45 modular ethernet connector 312. The programable accelerator 304 is connected to two small form-factor pluggable ("SFP") connectors 314 and 316 that may be used to connect with fiber-optic cables. The circuit board 300 includes an array of pins 318 that are inserted into an electrical connector, or expansion slot, of a mother board of the host. The TPM 310 is a dedicated microcontroller, or chip, that is designed to secure hardware through integrated cryptographic keys. The SNIC 222 includes non-volatile memory that stores virtual device functions 320 of a disaggregated hardware device ("DHD") located on another host of the data center.

The methods and systems described below create secure data transmission channels that enable the virtual device functions 320 to access a DHD of another host in the data center. For example, the SNIC 222 can be located on a host that does not have a hardware accelerator and runs a virtual machine ("VM") or a container that request use of a hardware accelerator to speed up data processing. Methods described below create a secure data channel between the SNIC 222 and an available DHD of another host, called a target host, of the data center. Once this secure data channel has been established as described below, the virtual device function 320 performs operations that enable the VM or the container to access and process data at the hardware accelerator of the target host over the data center network.

Figure 4:
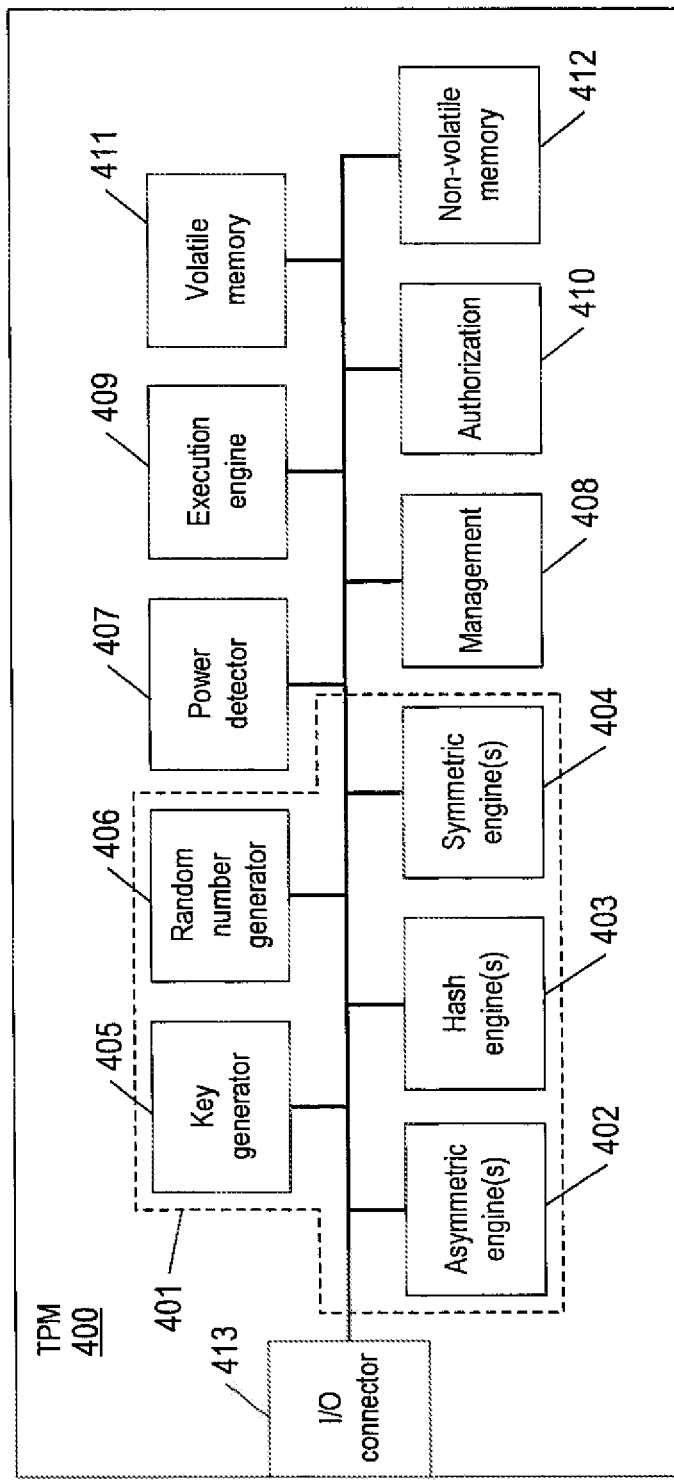
FIG. 4 shows an example architecture of a trust platform module.

FIG. 4 shows an example architecture of a TPM 400. The TPM 400 includes a cryptographic subsystem 401 that is composed of an asymmetric engine 402, a hash engine 403, a symmetric engine 404, a key generator 405, and a random number generator ("RNG") 406. The cryptographic subsystem 401 implements the cryptographic functions of the TPM 400. The asymmetric engine 402 performs asymmetric encryption and decryption and asymmetric signing and signature verification. The hash engine 403 executes a hash function to provide integrity checking and authentication. The symmetric engine 404 performs symmetric encryption and decryption and symmetric signing and signature verification. For example, in one implementation, the symmetric engine 404 executes a symmetric block cipher message authentication code ("SMAC"). The symmetric engine 404 also executes a hash message authentication code ("HMAC") to provide assurances that protect data has not been modified and that the data came from an entity with access to a key.

The key generator 405 produces two different types of keys using a key derivation function ("KDF"). The KDF is a cryptographic algorithm that derives one or more secret keys from a secret value, such as a master key, a password, or a passphrase, using a pseudorandom function. The pseudorandom function can be a cryptographic hash function. The first key is produced using a random number generated by the RNG 406 as a seed. The first key is a secret key that is stored in the volatile memory 411. The second, is a primary key, that is derived from a seed value, such as a null seed, and not directly from the RNG 406. The KDF receives as input the seed and outputs the primary key.

The RNG 406 is the source of random numbers for the TPM 400 based on a random source, such as noise, clock variations, air movement, or other events. The random numbers produced by the RNG 406 are used to construct keys for symmetric and asymmetric cryptographic applications. Authorization system 410 checks that proper authorization for use of each of the shielded locations has been provided. The volatile memory 411 stores TPM transient data that is allowed to be lost when power to the TPM 400 is removed. The volatile memory 411 stores data in platform configuration registers ("PCRs") which are shielded locations of the volatile memory 411.

The non-volatile memory 412 contains shielded locations that can only be accessed with protected capabilities. The non-volatile memory 412 is used to store long term keys. Two long term keys that are stored in the non-volatile memory 412 are the endorsement key ("EK") and the storage root key ("SRK"), which forms the basis of a key hierarchy that manages secure storage. The EK is a fundamental component of the TPM 400 and consists of a private EK that never leaves the TPM 400 and a public EK that is recorded in a certificate. The TPM 400 manufacturer provides the EK pair and stores the pair in the non-volatile memory 412 before shipping. The certificate, or endorsement credential, can then be created with the public EK and information about the security properties of the TPM 400. The endorsement credential is signed by a certification authority, known as the TPME or Trusted Platform Module Entity, which can attest to the fact that the public EK contained in the certificate is a public EK whose corresponding private EK is stored in the TPM 400.

The power detector 407 manages power states of the TPM 400 in conjunction with the power states of the SNIC 222. The execution engine 409 responds to incoming requests and external commands from the CPU 302. The TPM 400 does not rely on an operating system and is not exposed to the vulnerabilities that might exist in an operating system or application software.

Servers are the traditional building blocks of a data center infrastructure where each workload is assigned to one server. With the monolithic serve model, each workload cannot use more memory, storage, or CPU resources than are available in the server the workload is assigned to and, in a traditional data center, servers do not share spare resources outside their own box. As a result, workloads deployed to data centers often use resources disproportionately. For example, some workloads may require large amounts of CPU usage but require a modest amount of memory. However, the excess memory cannot be accessed and used by another workload. On the other hand, other workloads consume large volumes of memory and require a modest amount of CPU usage. However, the CPUs cannot be accessed and used by another workload. This monolithic isolation of hosts resources is an inefficient use of the resources of the data center.

Recent developments in hardware resource disaggregation break with the traditional monolithic isolation of host resources by decomposing hosts of a data center into segregated, network-attached resource pools. Each pool of resources, such as CPUs, memory, accelerators, and storage, is independently constructed, managed, and scaled. Hardware resource disaggregation breaks the siloed host boundary by forming a resource layer of hardware resources that can be separately accessed via the data center network. Hardware resources are not restricted to any one host and can be allocated according to the computational needs of each workload. Disaggregation enables a workload to be decoupled from a particular server and have access to as many CPUs, as much memory, and as many accelerators of the resource layer to efficiently process the workload. When the workload is no longer required, those resources can then be returned to the respective pools and used by a different workload.

Figure 5A:
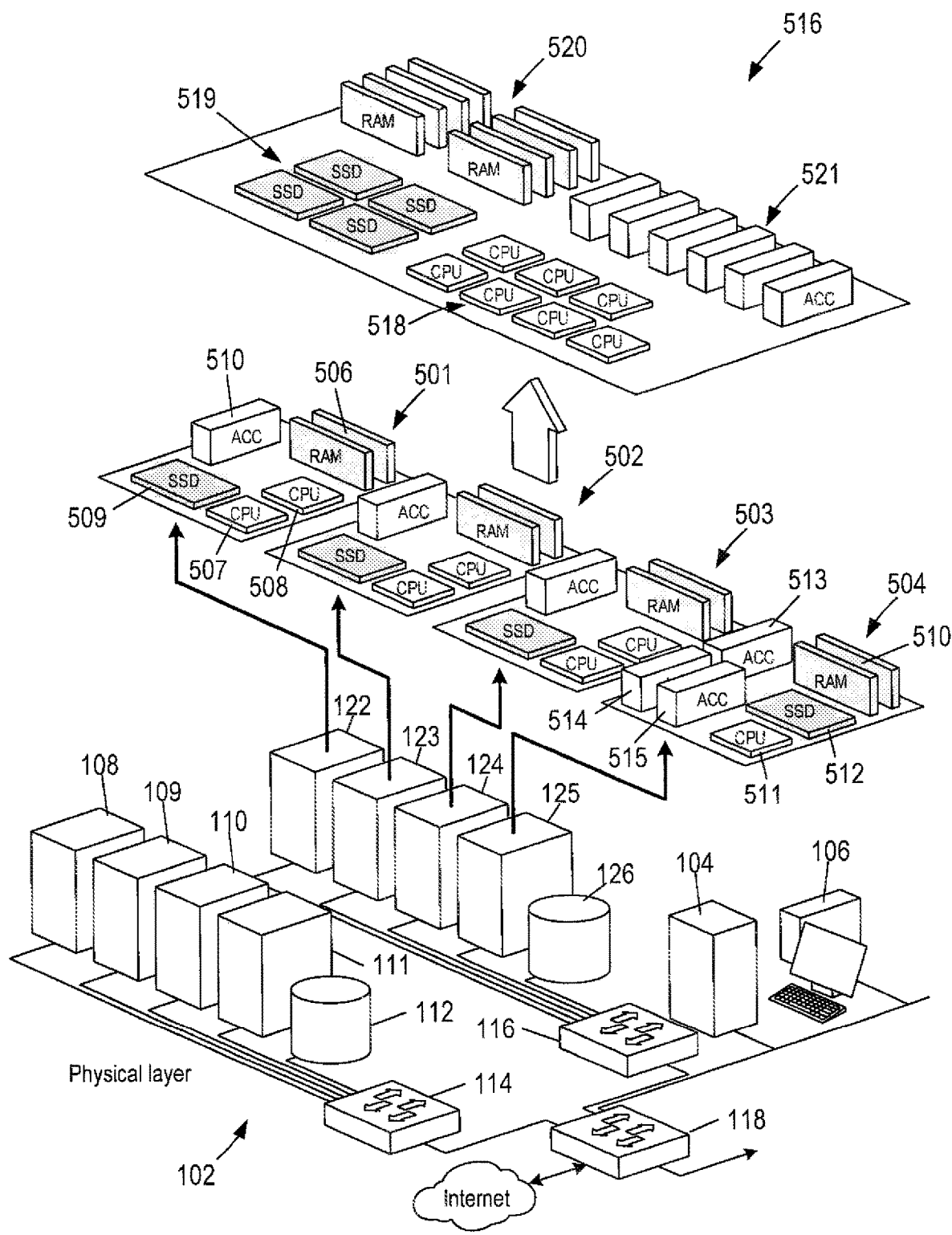
FIGS. 5A-5B show an example of hardware disaggregation.
Figure 5B:
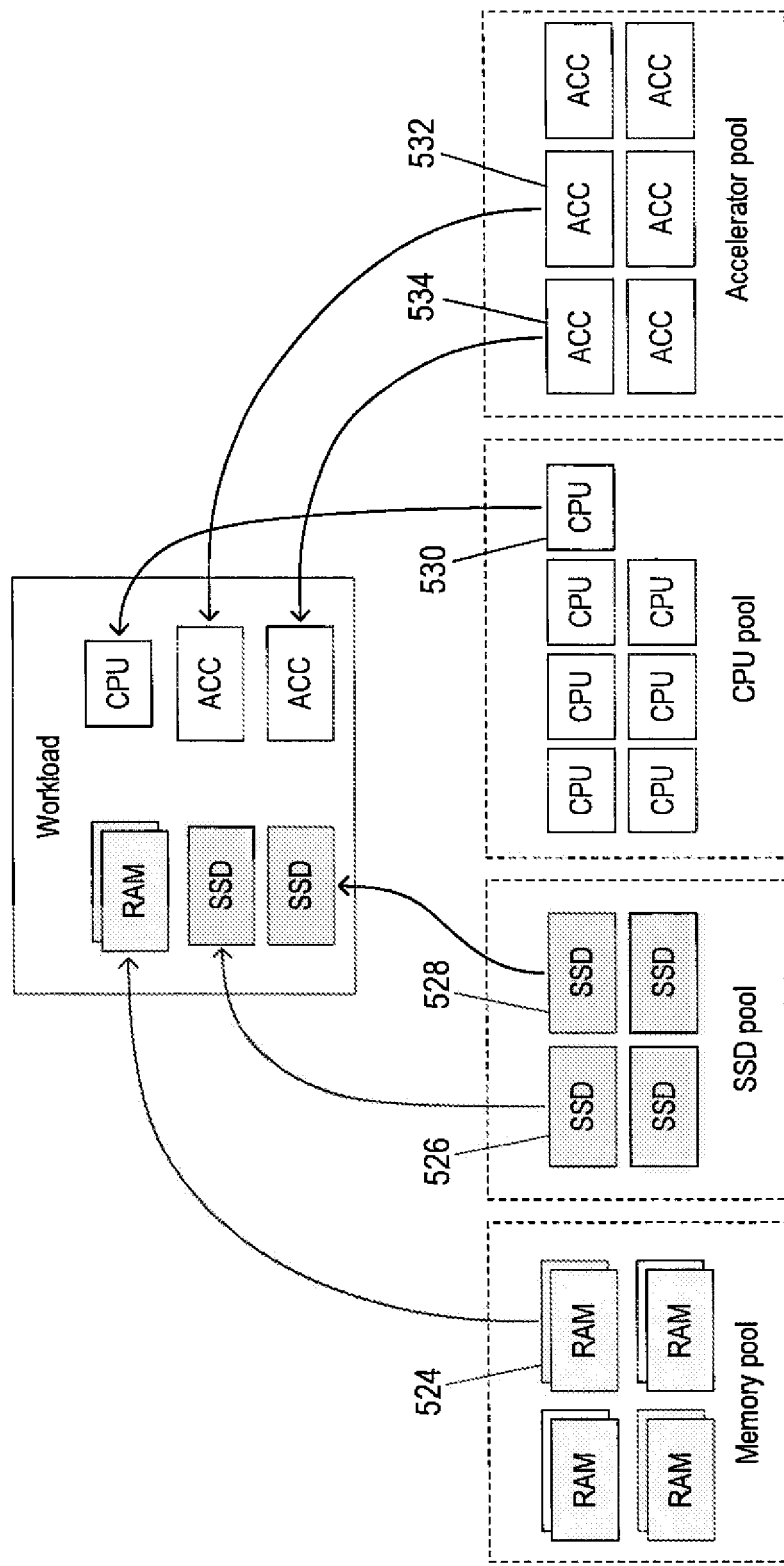

FIGS. 5A-5B show an example of hardware disaggregation with reference to the example data center 102 described above. FIG. 5A shows the hardware resources 501-504 of the hosts 122-125. For example, host 122 contains RAM 506, two CPUs 507 and 508, an SSD 509, and an accelerator 510. The hardware accelerator 510 can be an application specific integrated circuit, ("ASIC"), field programmable gate array ("FPGA"), a graphics processing unit ("GPU"), cryptographic accelerator, secure cryptoprocessor, digital signal processor, network processor, in-memory processing via network on a chip and systolic arrays. Host 125 contains RAM 510, a CPU 511, an SSD 512, and three accelerators 513-515. The three accelerators 513-515 can be any combination of ASICs, FPGAs, GPUs, cryptographic accelerators, secure cryptoprocessors, digital signal processors, network processors, and systolic arrays. The host 125 is a DHD lake with the three accelerators 513-515 accessible to applications executing in the data center 102. Hardware disaggregation opens up the hardware resources 501-504 of the hosts 122-125 to form a disaggregation resource layer 516 of resources that can be separately accessed via the network of the data center 102. Each type of hardware resources in the disaggregation resource layer 516 is a separate pool of resources. For example, the seven CPUs of the hardware resources 501-504 form a CPU pool 518, the four SSDs of the hardware resources 501-504 form an SSD pool 519, the eight RAM cards of the hardware resources 501-504 form a memory pool 520, and the six accelerators of the hardware resources 501-504 form an accelerator pool 521.

FIG. 5B shows an example of assigning resources of the resource pools 518-521 to process a workload. The workload is processed using RAM 524, SSDs 526 and 528, CPU 530, and two accelerators 532 and 534 taken from the respective resource pools 518-521. The resources can be located in different hosts of the data center 102. For example, RAM 524 can be the memory of host 122 and the accelerators 532 and 534 can be two accelerators in host 125.

Disaggregation has created a breakdown in the trusted computing environment of a data center. In a traditional data center, each host has a TPM that establishes a trusted environment for protecting the host from malicious attacks, such as malware, virus, and packet sniffing. A TPM can be used to protect host data via encryption and decryption, authenticate credentials of other hosts running in the data center, and prove which software is running on a host in the data center. However, in a data center with various DHDs, the DHDs must be accessible from different applications executing in the data center. As a result, conventional approaches to trusted computing cannot practically be used with separate disaggregated resources.

Methods and systems for creating secure data channels between a host and DHDs located on other hosts in a data center are now described. In the following discussion, methods and systems are described below with reference to creating a secure data channel between a host and a DHD located on another host in a data center using SNICs of the hosts.

Figure 6:
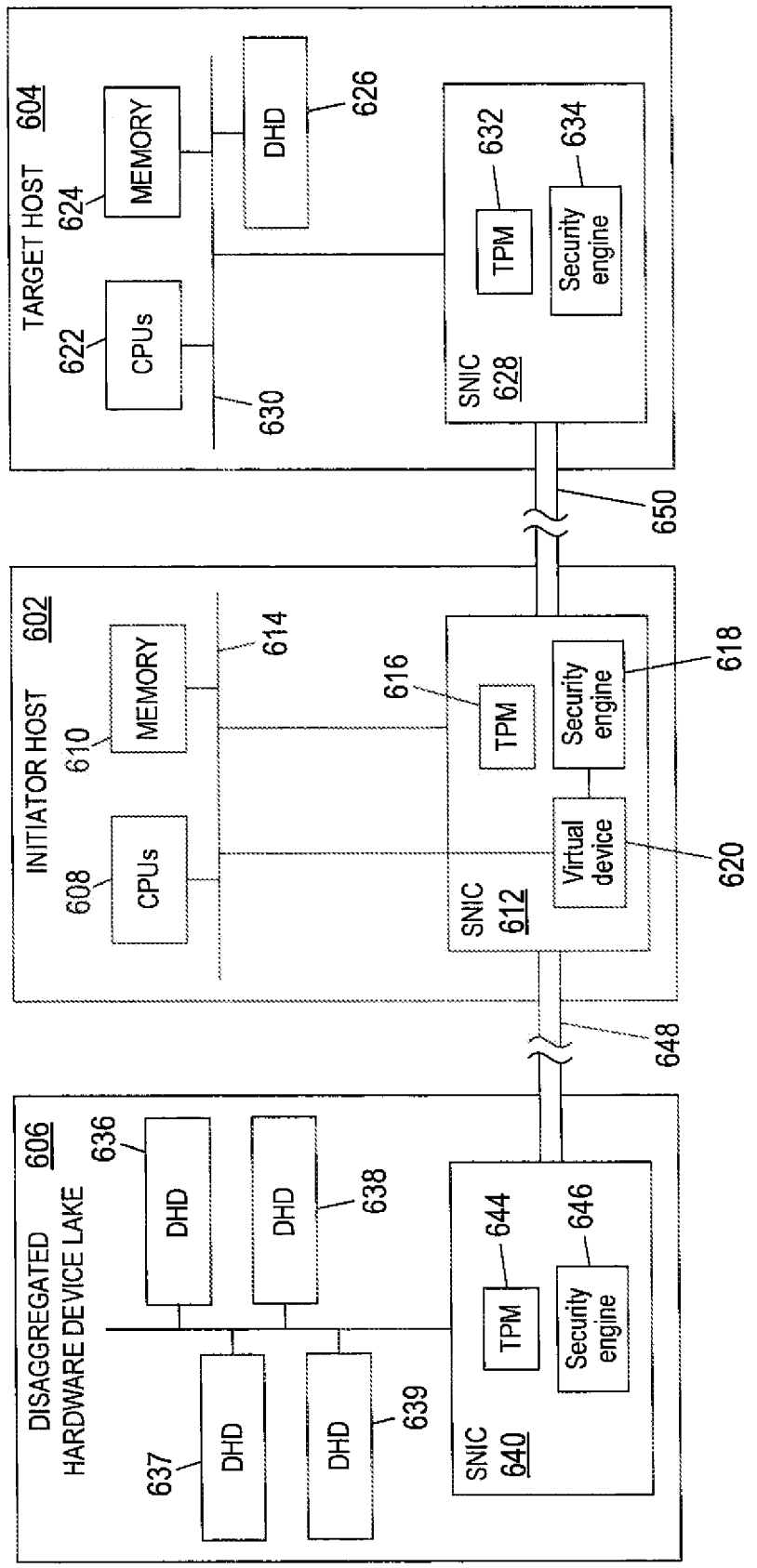
FIG. 6 shows an example architecture for securing data transmission between a host and disaggregated hardware of two other hosts in the same data center.

FIG. 6 shows an example architecture for securing data transmission between a host and disaggregated hardware of two other hosts in the same data center using SNICs of the hosts. In FIG. 6, a host 602, identified as the "initiator host," initiates a process of creating a secure data channel between the initiator host 602 and a DHD of one of the target hosts 604 and 606. The initiator host 602 includes a CPU 608, memory 610, and an SNIC 612 that are interconnected via a bus 614. The SNIC 612 includes a TPM 616, a security engine 618, and a virtual device 620 that is supported by the DHD for which a secure data channel is created with the initiator host 602 as described below. The virtual device 620 executes the virtual device functions 320 described above with reference to FIG. 3 and enables an DHD of one of the target hosts 604 and 606 to appears as a local DHD of the initiator host 602 that can be used by an object, such as a virtual machine ("VM") or a container, that is running on the initiator host 602 and has requested use a DHD. Establishing a secure data channel between the DHD of the targe host and the object running on the initiator host 602 is described below with reference to FIGS. 7-10. The target host 604 includes a CPU 622, memory 624, a DHD 626, and an SNIC 628 that are interconnected via a bus 630. The SNIC 628 includes a TPM 632 and a security engine 634. In this example, target host 606 is a DHD lake of disaggregated hardware. The DHD lake 606 includes four DHD 636-639 and an SNIC 640 interconnected via a bus 642. The SNIC 640 includes a TPM 644 and a security engine 646. The security engines 618, 634, and 646 may run in the programmable accelerators of the corresponding SNICs 612, 628, and 640. The initiator host 602, the target host 604, and the DHD host 606 have been attested to by a security authority of the data center and have been placed in a trusted computing pool of the data center. The SNICs 612, 628, and 640 are connected via network links 648 and 650 of the data center.

In the following discussion, the term "target" is used to refer to the target host 604 or the DHD host 606 and to components of the target host 604 and DHD host 606. For example, the term "target host" refers to the target host 604 or to the DHD host 606, and the term "target SNIC" refers to the SNIC 628 or the SNIC 640.

Establishing a secure data channel between the initiator host 602 and a DHD of a target host is performed in three phases. In the first phase, after the SNIC 612 has been attested to using the TPM 616 by a data center control plane service, the SNIC 612 is authorized to join the data center network fabric and creates a primary asymmetric key called the "disaggregated hardware management key pair" or simply "management key pair." The management key pair is obtained from inputting a null seed to the KDF of the TPM 616 and serves as the parent for deriving asymmetric initiator device key pairs for the SNIC 612. Analogously, the TPM of a target SNIC of a target host having an available DHD is used to create a management key pair that serves as the parent for deriving target device key pairs for the target SNIC. The initiator device key pairs and the target device key pairs are used to establish a secure data channel between the DHD of the target host and objects of the initiator host 602.

Figure 7:
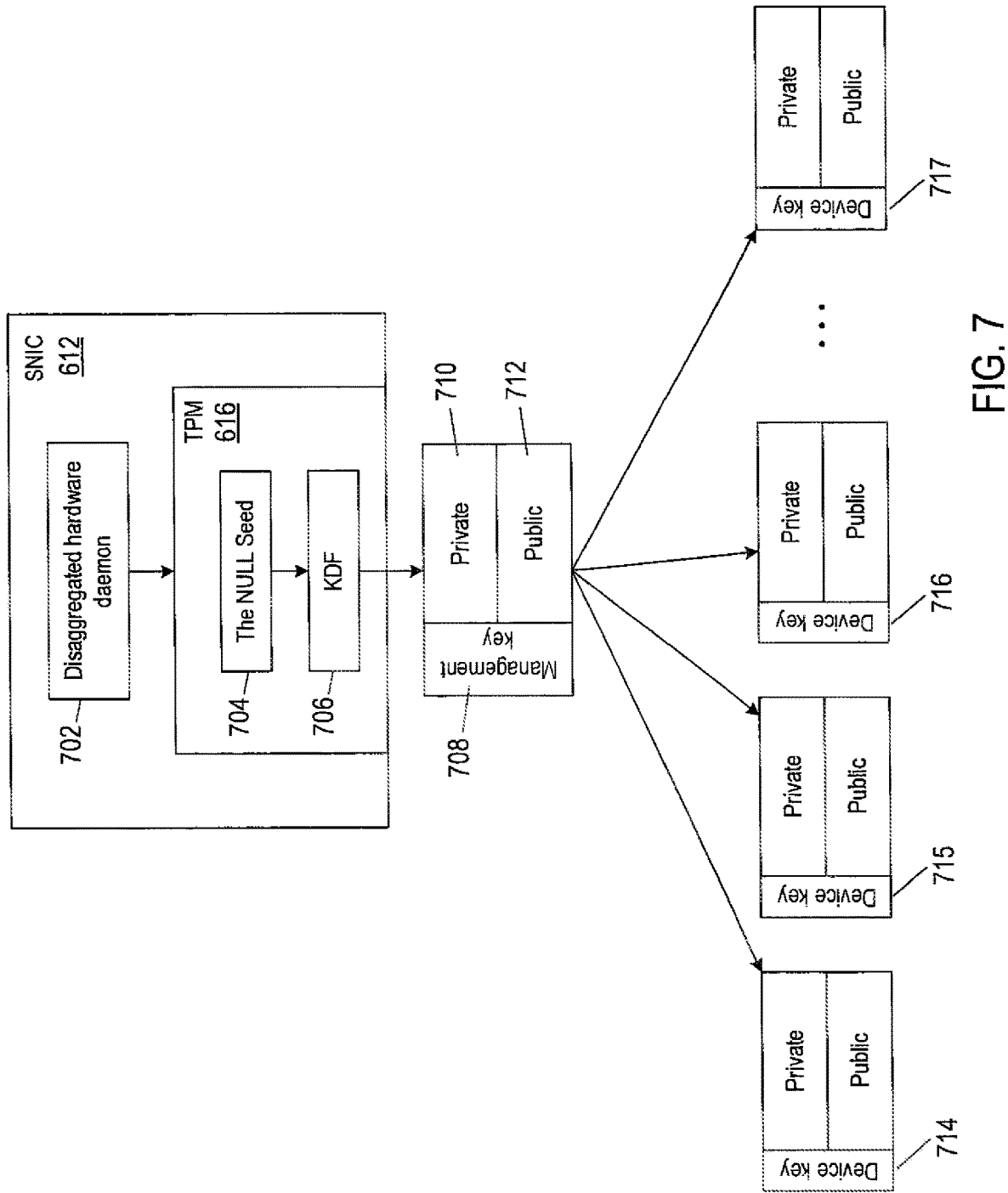
FIG. 7 shows an example of using a trusted platform module ("TPM") of an SNIC to generate a primary key and generate device keys.

FIG. 7 shows an example of using the TPM 616 of the SNIC 612 to generate a management key pair and device key pairs. The SNIC 612 runs a disaggregated hardware daemon 702, which is an algorithm that allocates DHDs to objects executing on the initiator host 602 or deallocates the DHDs when the DHDs are no longer needed by the objects of the initiator host 602. The TPM 616 uses the KDF of the key generator 405 to generate keys. In this example, the disaggregated hardware daemon 702 directs the TPM 616 to input a null seed 704 into the KDF 706 to generate the management key pair 708. The management key pair 708 is an asymmetric key consisting of a private management key 710 and a public management key 712. The null seed 704 is a random value that is reset with every reset of the TPM 616, and objects in the null hierarchy cannot be made into persistent objects. The management key pair 708 is generated by the disaggregated hardware daemon 702, and the lifecycle aligns with that of the disaggregated daemon hardware 702. The disaggregated hardware daemon 702 is created after SNIC 612 bootup is complete and is destroyed when the SNIC 612 is powered off. During the life cycle of the disaggregated hardware daemon 702, objects running on the initiator host 602 may be allocated DHDs of target hosts. For each DHD used by an object of the initiator host 602, the disaggregated hardware daemon 702 creates a corresponding initiator device key pair that is used to create a secure data channel between the initiator host and the DHD of a target host. As shown in FIG. 7, each initiator device key pair is derived from the management key pair 708 and is located on the initiator SNIC 612. In other words, because there may be many DHD allocations and release actions, each DHD has its own corresponding initiator device key pair. The initiator device key pair is composed of an initiator public device key and an initiator private device key. For example, initiator device key pairs 714-717 are derived from the management key pair 708 and correspond to seven different DHDs of the target hosts. The disaggregated hardware daemon 702 destroys the initiator device key pairs 714-717 when the pairs are no longer used by the DHDs. When the SNIC 612 boots up and is attested to by the security authority, the disaggregated hardware daemon 702 creates a new management key pair 708 using the TPM 616 that serves as root key of disaggregated hardware hierarchy. Whenever the initiator host 602 intends to allocate a DHD for an object executing on the initiator host 602, the disaggregated hardware daemon 702 creates an initiator device key pair from the management key pair 708 to protect a secure data channel and destroys the initiator device key pair when the DHD is no longer used by the object.

Note that when a DHD of a target host has been identified and reserved for use by an object of the initiator host 602, the TPM of the target SNIC of the target host is used to create an asymmetric target device key pair composed of a target private device key and a target public device key.

The private and public device keys of the device key pairs can be created in the respective TPMs of the initiator and target SNICs using any one of many different cryptographic algorithms, such as RSA ("Rivest-Shamir-Adleman"), SHA1 ("secure hash algorithm 1") and HMAC ("hash-based message authentication code"). The public device key is used by the security engine of the SNIC to encrypt data sent from a host to a receiving host. However, only the security engine of the SNIC of the receiving host has access to the private device key that is used to decrypt the encrypted data, thereby extracting the original data.

In the second phase, when the initiator host 602 intends to allocate a DHD of a target host for use by an object running on the initiator host 602, the initiator host 602 directs the SNIC 612 to compose a hardware allocation request with hardware specifications for the DHD to be used by the object. Under the hardware allocation request, the SNIC 612 generates an initiator device key pair, stores the initiator private device key at the security device of the SNIC 612 and packs the initiator public device key with the hardware allocation request and sends the request to a disaggregated hardware management component of the data center control plane service. The disaggregated hardware management component checks for an available DHD that matches the hardware specifications in a trusted computing resource pool of the data center. When a qualified DHD is found, the disaggregated hardware management component issues a certificate that verifies the authenticity of the initiator public device key to guarantee trust in the initiator public device key. Because the SNIC 612 has been attested to and placed into a trusted resource pool when the initiator host 602 was attested to by the security authority of the data center, the disaggregated hardware daemon 702 is authentic. As a result, the communication channel for sending the initiator public device key is secured by the certificate of the control plane. The disaggregated hardware management component sends a device reserve request to the target SNIC of the target host equipped with the DHD.

Once the target SNIC receives the request, the target SNIC audits the certificate of the initiator public device key. The target SNIC audits the certificate by performing a certificate verification procedure. Certificate verification is the process of validating the certificate to ensure authenticity of the certificate, integrity, and that the certificate was issued by a trusted Certificate Authority ("CA"). If the certificate is valid and trustworthy, the target SNIC request reservation of the disaggregated hardware resource. The target SNIC generates an asymmetric key called a target device key pair using the TPM of the target SNIC. The target device key pair includes a target public device key and a target private device key. The target SNIC stores the target private device key in the security engine of the target SNIC. The target SNIC sends a message containing the target public device key and network ports of the SNIC 612 to the shared hardware manager of the data center. The shared hardware manager issues a certificate of the target public device key from the target SNIC and responds to the SNIC 612 with the certificate and port information from the target SNIC. The initiator SNIC 612 uses the target public device key to encrypt data sent from the initiator host 602 to the target SNIC. The security engine of the target SNIC uses the target private device key to decrypt the encrypted data.

Figure 8:
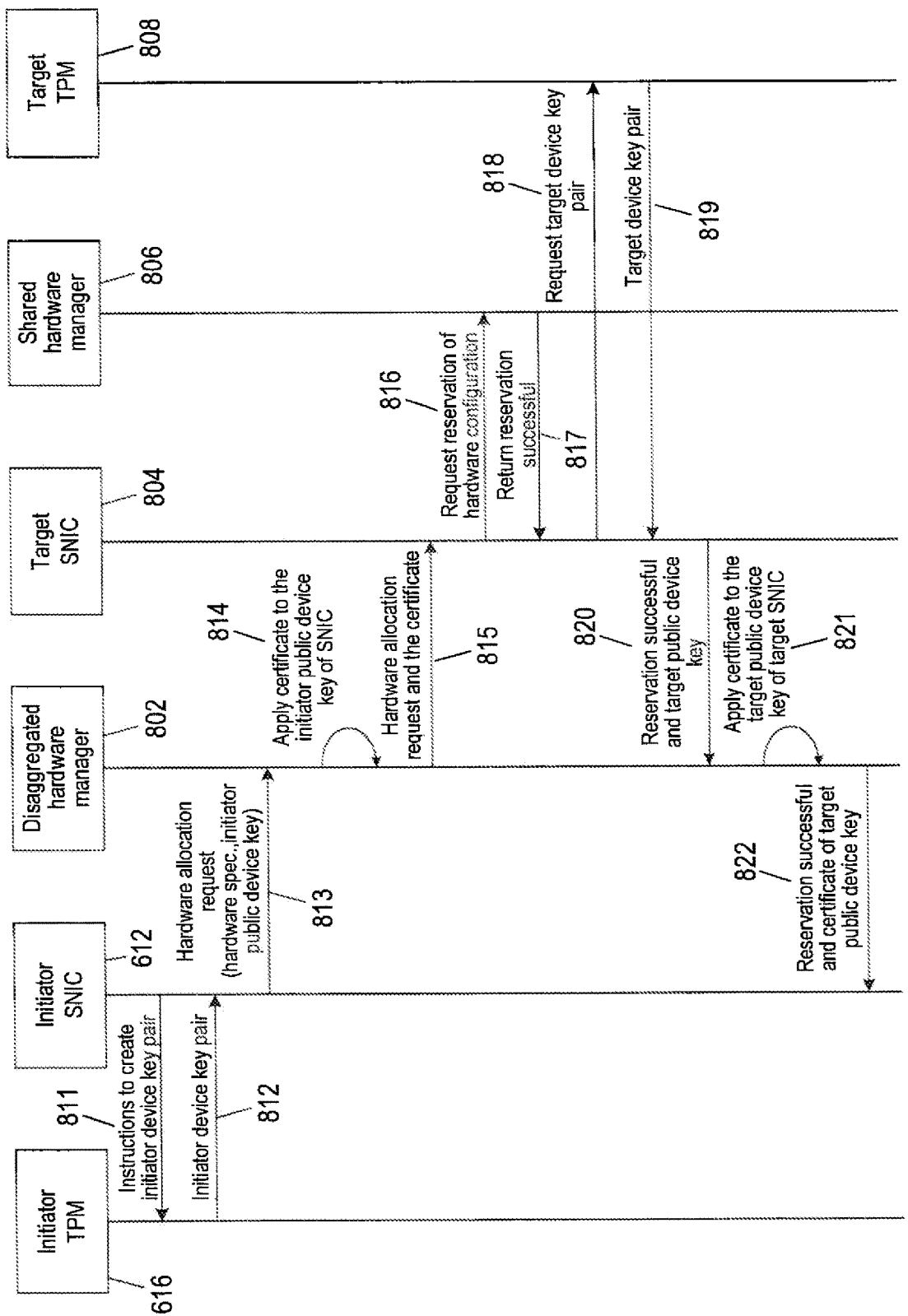
FIG. 8 shows a sequence diagram of a process for establishing secure data transmission between an SNIC of an initiator host and an SNIC of a target host equipped with a disaggregated hardware device.

FIG. 8 shows a sequence diagram of a process for establishing secure data transmission between the initiator SNIC 612 of the initiator host 602 and a target SNIC of a target host equipped with a DHD. The disaggregated hardware daemon 702 running in the initiator SNIC 612 sends instructions 811 directing the TPM 616 to generate an initiator device key pair as described above with reference to FIG. 7. The TPM 616 sends 812 the initiator device key pair to initiator SNIC 612. The SNIC 612 stores the initiator device key pair 812 to secure a channel with the DHD. The disaggregated hardware daemon 702 constructs a hardware allocation request that contains hardware specifications received from the initiator host 602 and sends 813 the initiator public device key and the hardware allocation request to a disaggregated hardware manager 802 that runs in the control plane of the data center. The hardware allocation request contains hardware specifications about a DHD the initiator host 602 desires for execution of an object of the initiator host 602. For example, the hardware specifications may be for a particular GPU, ASIC, FPGA, cryptographic accelerator, secure cryptoprocessor, digital signal processor, network processor, or a systolic array. The disaggregated hardware manager 802 searches a trusted computing resource pool of the data center for an available DHD that matches the specification in the hardware allocation request. The trusted computing resource pool of the data center contains a list of available DHDs and specifications of each available DHD. The trusted computing resource pool is updated when a DHD is assigned to an object and when a DHD is free for another assignment.

When a DHD is identified by the disaggregated hardware manager 802 as matching the hardware specifications in the trusted computing resource pool, the disaggregated hardware manager 802 applies 814 a certificate of authenticity to the public device key to guarantee trustworthiness of the SNIC 612. The certificate is issued by the CA of the data center control plane. The certificate is used by the target SNIC 804 to verify authenticity of the initiator public device key. The certificate means that the control plane guarantees trustworthiness of the initiator public device key and the initiator SNIC 612. The disaggregated hardware manager 802 sends 815 the hardware allocation request and the certificate to a target SNIC 804 of a target host that contains the DHD identified by the disaggregated hardware manager 802.

When the target SNIC 804 receives the hardware allocation request, the target SNIC 804 verifies the authenticity of the certificate. If the target SNIC 804 proves the certificate is authentic, the target SNIC 804 sends 816 a request to a shared hardware manager 806 of the target host to reserve the DHD. The shared hardware manager 806 runs on the target host and tracks which DHDs of the target host are available and not available. If the DHD is available, the shared hardware manager 806 reserves the DHD and sends 817 a notification to the target SNIC 804 that the reservation of the DHD is successful. The target SNIC 804 requests 818 the TPM 808 of the target SNIC 804 to create a target device key pair. The target SNIC 804 runs a disaggregated hardware daemon that is used to generate the target device key pair. The TPM 808 sends 819 the target device key pair to the target SNIC 804. The target SNIC 804 sends the target private device key to the security engine of the target SNIC 804 for encrypting outgoing data sent from the target SNIC 804 to the SNIC 612. The target SNIC 804 uses the initiator public device key obtained from the SNIC 612 to decrypt incoming encrypted data from the SNIC 612.

The target SNIC 804 sends 820 a notification that the reservation of the DHD is successful and the target public device key to the disaggregated hardware manager 802. The disaggregated hardware manager 802 issues and applies a certificate of authenticity of the target public device key of the target SNIC 804 and sends 822 the certificate together with other reservation information of the DHD to the initiator SNIC 612.

The SNIC 612 uses the target public device key to decrypt data received from the target SNIC 804 and uses the initiator private device key to encrypt data that is sent to the target SNIC 804. The target SNIC 804 uses the initiator public device key of the SNIC 612 to decrypt data received from the SNIC 612. The target SNIC 804 uses the target private device key to encrypt data sent to the SNIC 612. As a result, the SNIC 612 and the target SNIC 804 have established a secure data channel for sending data to and from the DHD.

Figure 9:
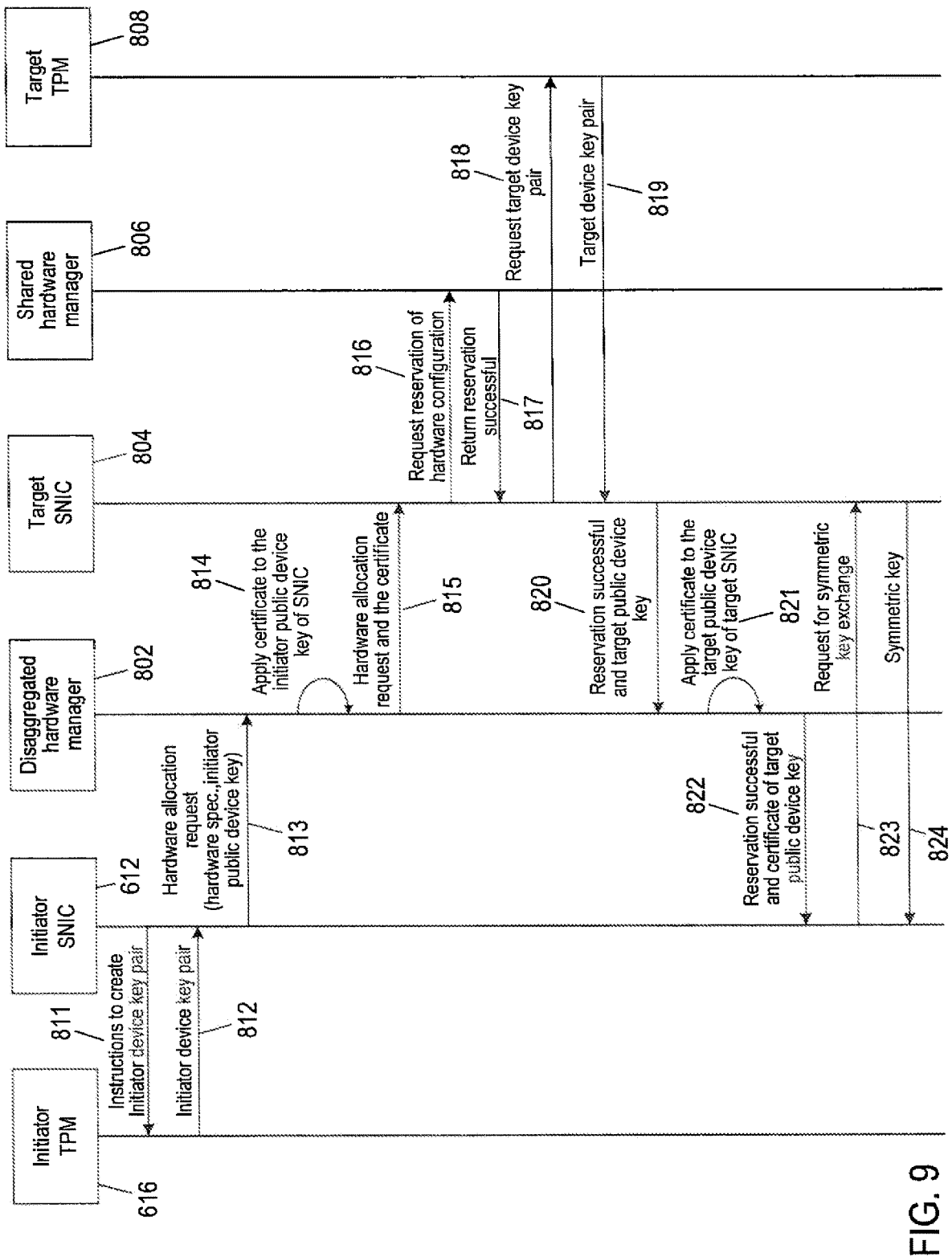
FIG. 9 shows a sequence diagram of another process for establishing secure data transmission between an SNIC of an initiator host and an SNIC of a target host equipped with a disaggregated hardware device.

FIG. 9 shows a sequence diagram of a process for establishing secure data transmission between the SNIC 612 of the initiator host 602 and an SNIC of a target host equipped with a DHD. The sequence diagram is similar to the sequence diagram in FIG. 8 and includes additional transmissions for establishing a secure channel with symmetric encryption between the SNIC 612 and the target SNIC 804. In this example, the SNIC 612 sends 823 a request to establish symmetric encryption key negotiation or shared key exchange to the target SNIC 804. The symmetric encryption and decryption requires far fewer computing resources and are more efficient than asymmetric algorithms described above with reference to FIG. 8. The target SNIC 804 responds to the request based on information contained in the request. For example, the initiator SNIC 612 and the target SNIC 804 may execute the Diffie-Hellman key-exchange protocol that enables the initiator SNIC 612 and the target SNIC 804 to establish a symmetric key. As a result, the initiator SNIC 612 and the target SNIC 804 share a symmetric key pair for data encryption and decryption. The SNIC 612 and the target SNIC 804 set the secure engines of the SNIC 612 and the target SNIC 804 to encrypt and decrypt data using the same symmetric pair key.

In the third phase, the SNIC 612 and target SNIC 804 use the respective public device keys for data decryption and associated private device keys for data encryption. In an alternative implementation, the SNIC 612 and target SNIC 804 use the symmetric key pairs for data encryption and decryption. The encryption and decryption are executed by the security engines of the SNIC 612 and target SNIC 804. With the bidirectional data flow of encrypted data, a reliable and secure data channel is established between the DHD of the target host and the initiator host 602. After the secure channel has been established between the initiator host 602 and the DHD, the SNIC 612 builds the virtual device 620 that corresponds to an allocation of the DHD and presents the virtual device 620 to the initiator host 602 as a local hardware device that satisfies the hardware specifications in the hardware allocation request. The term "virtual device" is used to distinguish the DHD from other local hardware devices of the initiator host 602. The SNIC 612 presents the virtual device 620 to the initiator host 602 as if the DHD where a local hardware device of the initiator host 602. When the virtual device 620 receives a request for processing a workload from an object of the initiator host 602, the virtual device 620 prepares a request for accessing the DHD. The initiator host 602 can assign the workload to the DHD. For example, the object is allocated access to, and usage of, the DHD for a period of time or until the workload of the object is finished.

Figure 10:
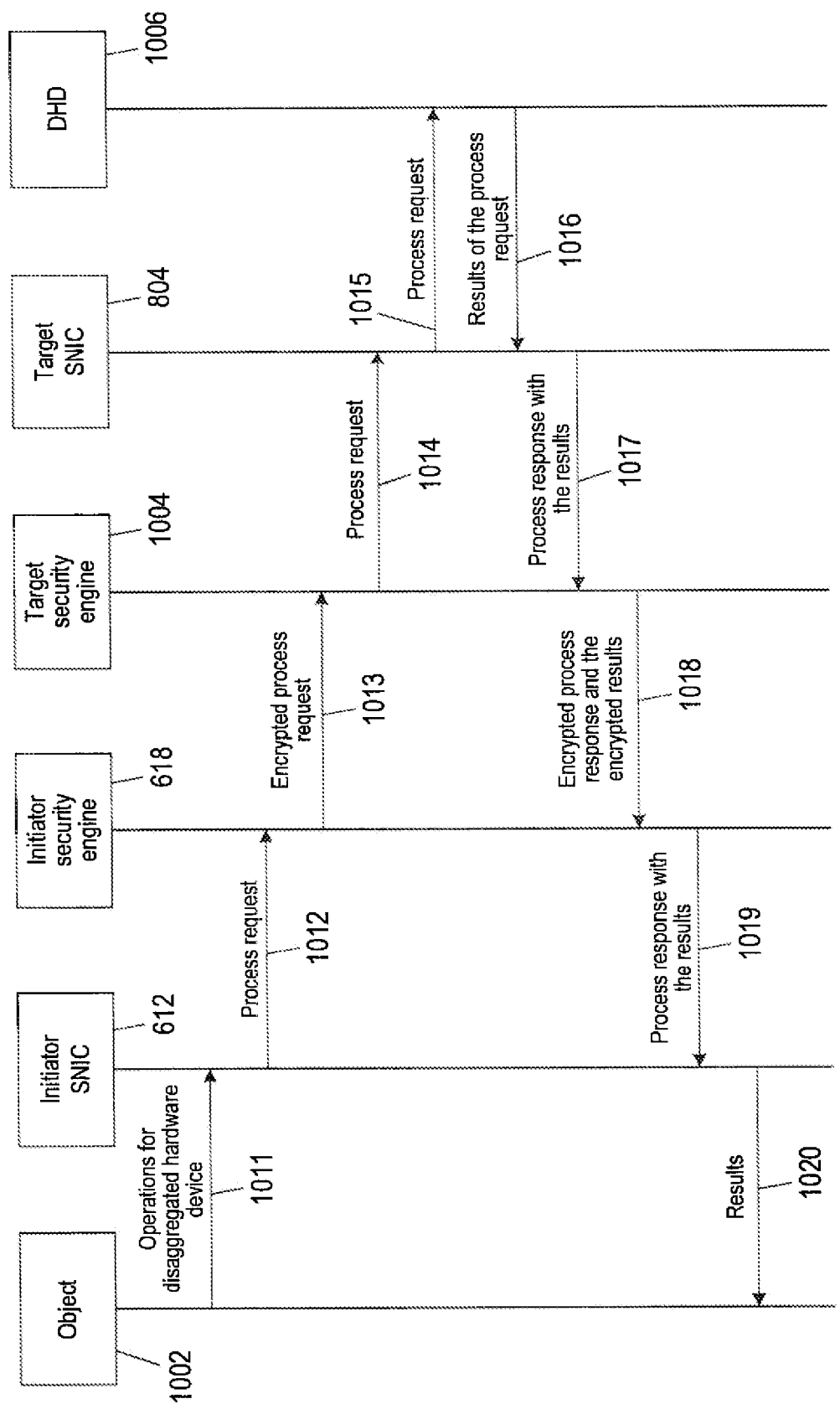
FIG. 10 shows a sequence diagram of sending a processing request to a disaggregated hardware device and receiving processing results from the disaggregated hardware device.

FIG. 10 shows a sequence diagram of using the SNIC 612 send a process request to the DHD and receiving processing results of the DHD from the target SNIC 804. The object 1002 represents a VM or a container of the initiator host 602. The object 1002 sends 1011 a process request to the initiator SNIC 612 to use the allocated DHD to perform processing operations through a supporting library or framework. The virtual device 620 running on the SNIC 612 assembles the process request and sends 1012 the process request to the security engine 618 of the SNIC 612. The security engine 618 encrypts the process request using the initiator private device key to obtain an encrypted process request. The security engine 618 sends the encrypted process request to security engine 1004 of the target SNIC 804. The security engine 1004 uses the initiator public device key to decrypt the encrypted process request to obtain the original process request and notifies 1014 the target SNIC 804 of the processing request. The target SNIC 804 forwards 1015 the process request to the DHD 1006 of the target host. The DHD processes the process request and sends 1016 results output from the DHD 1006 to the target SNIC 804. The target SNIC 804 combines a process response with the results and sends 1017 the process response and the results to the security engine 1004. The security engine 1004 encrypts the results using the target private device key and transmits 1018 the encrypted results to the security engine 618 of the SNIC 612. The secure engine 618 decrypts the results using the target public device key and sends the results to the virtual device 620 running in the SNIC 612. The virtual device 620 extracts the results and sends 1020 the results to the object 1002.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for establishing a secure data channel between an initiator host and a disaggregated hardware device ("DHD") of a target host in a data center, the method comprising:
   creating an initiator device key pair at an initiator smart network interface card ("SNIC") of the initiator host, the initiator device key pair having an initiator private device key and an initiator public device key;
   reserving a DHD at the target host in response to a target SNIC of the target host receiving a hardware allocation request and the initiator public device key from the initiator SNIC;
   creating a target device key pair at the target SNIC of the target host, the target device key pair having a target private device key and a target public device key; and
   sending a notification of a successful reservation of the DHD and the target public device key to the initiator SNIC from the target SNIC,
   wherein reserving the DHD at the target host comprises:
      constructing the hardware allocation request in response to the initiator SNIC receiving a hardware specification for running an object on the initiator host;
      sending the hardware allocation request and the initiator public device key from the initiator SNIC to a disaggregated hardware manager of the data center;
      searching a trusted computing resource pool of the data center for an available DHD that matches the hardware specification in the hardware allocation request; and
      applying a certificate to the initiator public device key when an available DHD that matches the hardware specification in the hardware allocation request is identified in the trusted computing resource pool.

2. The method of claim 1 wherein creating the initiator device key pair at the initiator SNIC comprises generating a management key pair using a trusted platform module ("TPM") of the initiator SNIC in response to the TPM receiving instructions from a disaggregated hardware daemon running on the initiator SNIC.

3. The method of claim 1 further comprising the initiator SNIC and the target SNIC establishing a symmetric key pair for sending data to the DHD of the target host.

4. A system for securing data transmission between a host and a disaggregated hardware device ("DHD") of a data center, the system comprising:
   an initiator host that provides an execution environment for running an object;
   an initiator smart network interface card ("SNIC") interconnected with a bus of the initiator host, the initiator SNIC having a trusted platform module ("TPM"), a virtual device corresponding to a hardware allocation of the DHD that satisfies hardware specifications of the object and presented to the initiator host as a local hardware device that satisfies the hardware specifications of the object, and a security engine;
   a target host equipped with the DHD; and
   a target SNIC interconnected with a bus of the target host, the target SNIC having a TPM and a security engine, the TPM and the security engine of the initiator SNIC and the TPM and the security engine of the target SNIC establishing a secure data channel between the object and the DHD to enable the object to access the DHD over the secure data channel through the virtual device.

5. The system of claim 4 wherein the TPM of the initiator SNIC comprises a key derivation function that creates an initiator device key pair having an initiator private device key and an initiator public device key.

6. The system of claim 4 wherein the TPM of the target SNIC comprises a key derivation function that creates a target device key pair having a target private device key and a target public device key.

7. The system of claim 4 wherein the security engine of the initiator SNIC encrypts data for sending to the DHD using an initiator private device key created by the TPM of the initiator SNIC and decrypts results generated by the DHD using a target public device key created by the TPM of the target SNIC.

8. The system of claim 4 wherein the security engine of the target SNIC encrypts results generated by the DHD using a target private device key created by the TPM of the target SNIC and decrypts data sent to the DHD from the initiator SNIC using an initiator public device key created by the TPM of the initiator SNIC.

9. The system of claim 4 further comprising a disaggregated hardware manager that searches a trusted computing resource pool of the data center to identify the DHD of the target host.

10. The system of claim 4 wherein the target host comprises a shared hardware manager that tracks which DHDs of the target host are available.

11. A method for establishing a secure data channel between an initiator host and a disaggregated hardware device ("DHD") of a target host in a data center, the method comprising:
    creating an initiator device key pair at an initiator smart network interface card ("SNIC") of the initiator host, the initiator device key pair having an initiator private device key and an initiator public device key;
    reserving a DHD at the target host in response to a target SNIC of the target host receiving a hardware allocation request and the initiator public device key from the initiator SNIC;
    creating a target device key pair at the target SNIC of the target host, the target device key pair having a target private device key and a target public device key; and
    sending a notification of a successful reservation of the DHD and the target public device key to the initiator SNIC from the target SNIC,
    wherein reserving the DHD at the target host comprises:
        sending the hardware allocation request and a certificate verifying the trustworthiness of the initiator public device key to the target SNIC;
        reserving the DHD of the target host, the DHD matching the hardware specification in the hardware allocation request;
        generating the target device key pair using a target TPM of the target SNIC in response to the target TPM receiving instructions from the target SNIC; and
        sending the notification of the successful reservation of the DHD and the target public device key from the target SNIC to the initiator SNIC.

12. The method of claim 11 wherein creating the initiator device key pair at the initiator SNIC comprises generating a management key pair using a trusted platform module ("TPM") of the initiator SNIC in response to the TPM receiving instructions from a disaggregated hardware daemon running on the initiator SNIC.

13. The method of claim 11 further comprising the initiator SNIC and the target SNIC establishing a symmetric key pair for sending data to the DHD of the target host.

* * * * *